M. C. I. HUNTER.
CONSTRUCTION AND ARRANGEMENT OF MOTOR VEHICLES.
APPLICATION FILED JULY 24, 1918.
1,361,864.
Patented Dec. 14, 1920.
2 SHEETS—SHEET 1.
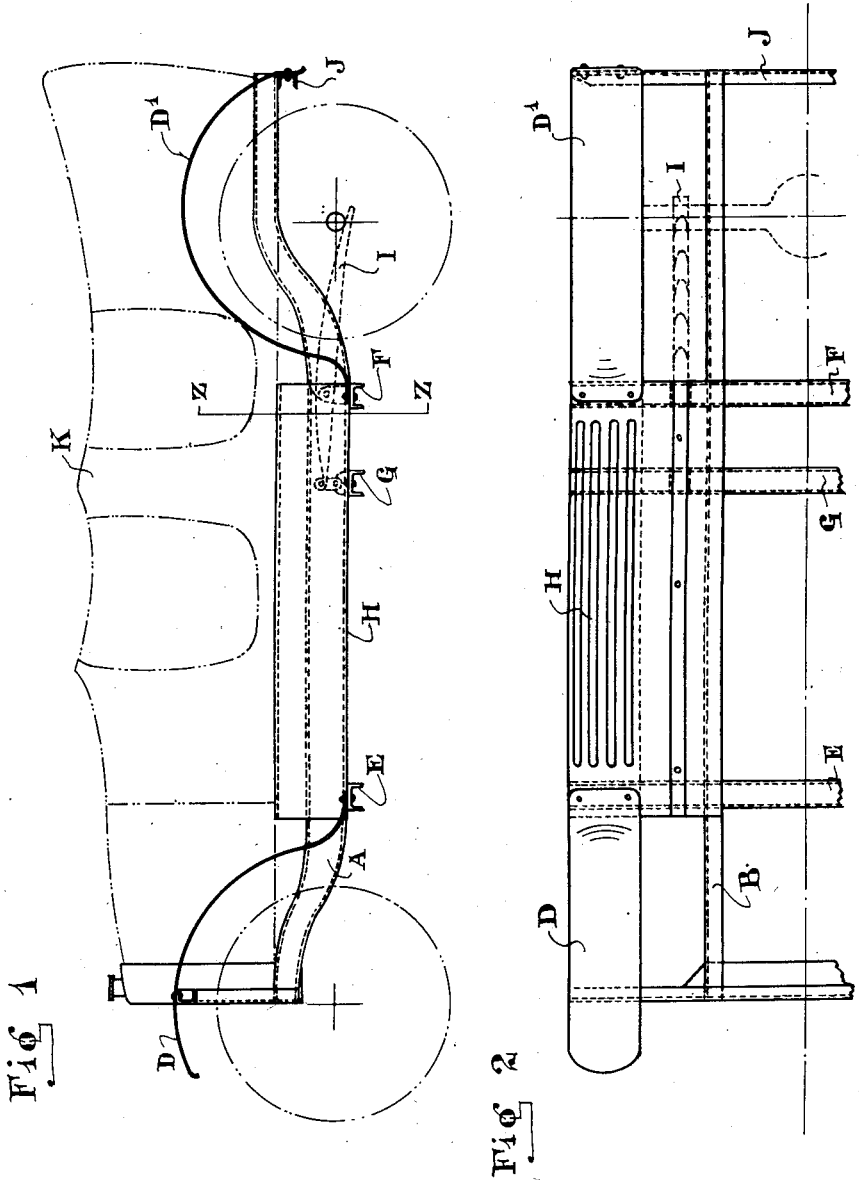

M. C. I. HUNTER.
CONSTRUCTION AND ARRANGEMENT OF MOTOR VEHICLES.
APPLICATION FILED JULY 24, 1918.
1,361,864.
Patented Dec. 14, 1920.
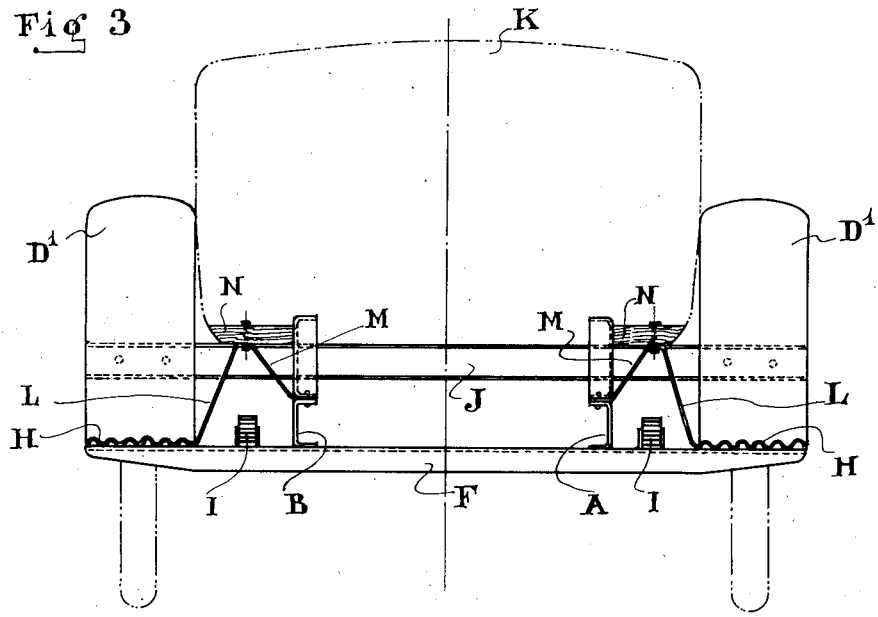
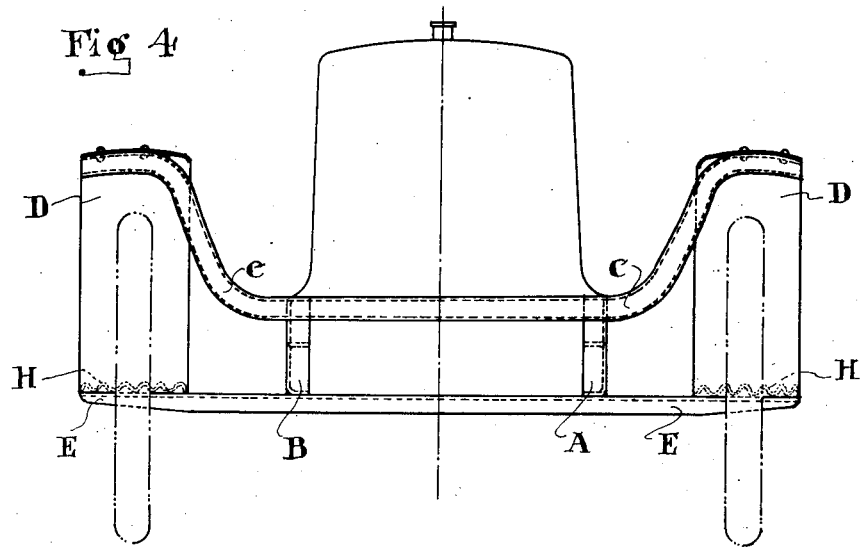

UNITED STATES PATENT OFFICE.

MARCUS CHARLES INMAN HUNTER, OF GLASGOW, SCOTLAND.

CONSTRUCTION AND ARRANGEMENT OF MOTOR-VEHICLES.

1,361,864.    Specification of Letters Patent.    Patented Dec. 14, 1920.

Application filed July 24, 1918. Serial No. 246,557.

*To all whom it may concern:*

Be it known that I, MARCUS CHARLES INMAN HUNTER, a subject of the King of Great Britain and Ireland, residing at 1272 Dumbarton road, Whiteinch, Glasgow, Lanarkshire, Scotland, have invented an Improved Construction and Arrangement of Motor-Vehicles, of which the following is the specification.

This invention relates to an improved construction and arrangement of mechanically propelled vehicles.

The improved construction and arrangement relates chiefly to the frame and chassis and to structural improvements therein, and in the associated parts, whereby the footsteps on each side, the mudguards at front and rear, the valances, the suspension springs and the body are better secured and supported and carried then hitherto, the object of the invention being to provide an improved construction that shall effect greater rigidity and strength in the chassis when in use, a reduction in weight, and the construction being more simple to manufacture, the cost will be reduced.

The two main or longitudinal members of the frame are preferably curved downwardly in the center thereof, and transverse members of a greater length than is usual are provided secured to the main longitudinal members, and so arranged with relation to the main or longitudinal members that they are adapted to support the footsteps, the mudguards, the valances, and the rear springs, without the necessity of providing projecting brackets secured to the said main members.

The said main or longitudinal members are arranged closer together than is usual, in order that they may be straight in one plane or parallel throughout their length, and thus avoid the necessity of the usual curve near the front of the frame to provide clearance for the maximum turning movement of the steering wheels. The transverse frame members supporting the footsteps are preferably attached to the under-side of the main longitudinal members of the frame. The front transverse frame member is curved upwardly to support the forward end of the mudguards on each side. The valances which are of special construction as hereinafter described, provide better means in combination with the other members of the frame for supporting the body of the car. The footstep or platform is preferably made integrally with the valance, and is preferably fluted to stiffen it. Preferably the valance where made integrally with the footstep or platform is made to coincide or is arranged in alinement with the upper edge of the rear transverse member of the frame. By this means the underside of the body or carriage work may form a straight line or a plane surface without projections, while retaining the advantage of a good clearance above the rear axle.

And in order that my invention may be completely understood, reference should be made to the accompanying sheets of drawings which illustrate the preferred mode of carrying the invention into effect:—

Figure 1 is an elevation of the improved motor vehicle showing the body in dotted lines.

Fig. 2 is a half plan of same without the body.

Fig. 3 is a section through the chassis and associated parts on the line Z Z in Fig. 1.

Fig. 4 is a front elevation.

In each of the figures like reference letters refer to like parts.

A and B are the two main or longitudinal frame members. These main frame members are curved downwardly at the center and are parallel throughout their length. C is the front transverse member which is secured to the forward ends of the main or longitudinal members. The transverse member C is curved upwardly at each end to support the front mudguards D D. E is a transverse member preferably in channel steel which is preferably straight throughout its length. It is riveted or otherwise secured on the underside of the downwardly curved parallel longitudinal members, and is extended outwardly at each end preferably to the outside line of the vehicle, and supports the forward end of the footplate or step and the rear end of the front mudguards D. F is a similar transverse member located at the rear part of the downward curve of the main or longitudinal members similarly extending without a bend to the outside line of the vehicle, and adapted to carry the rear end of the footplate or step H on each side, and the forward end of the rear mudguards D¹. G is a similar transverse member also preferably formed of channel steel similarly secured to the lower side of the main longitudinal members and adapted to support the footplate H intermediate the front and rear end supports E, F. The transverse member G may also conveniently carry by means of a link or shackle the front end of the cantaliver spring I shown in dotted lines. This arrangement of the two transverse members, or preferably three as shown, extending outwardly to the outer line of the footplate and mudguards, provides a particularly rigid construction and arrangement, especially for the support of the footplate and the inner ends of the mudguards. The other transverse member J of the frame riveted or otherwise secured at the rear ends of the longitudinal or main frame members is also straight and extends outwardly as shown to support in a rigid manner the rear ends of the rear mudguards. This member J also constitutes the rear support for the body K shown in dotted lines, in Figs. 1 and 3.

The rear axle springs I, although shown of the known cantaliver type pivotally carried by the transverse frame members F and G, may be of semi-elliptic or other suitable construction, and if of semi-elliptic form, the rear ends of the said springs would be secured to the frame member J.

The valances L are as shown preferably formed integrally with the step or footplate H on each side, and are preferably constructed as shown in Figs. 1 and 3 in such a manner that an inwardly projecting portion of same is secured to the upper flange of the longitudinal main members. To enable this to be done, the valances L are preferably formed as shown in section in Fig. 3, not only integrally with the footplate or step H, but also with the downwardly depending portion M, thus the footplate, valance and the downwardly depending portion M constitute a support for the longitudinal members N of the body of the vehicle. The valance and integrally formed plate M being as shown of either U or V section, are of relatively rigid form, although constructed in sheet metal.

What I do claim as my invention and desire to secure by Letters Patent is:—

1. The construction and arrangement of motor car frame and chassis including steps, two longitudinal frame members having downwardly curved portions between the axles, said downwardly curved portions extending for substantially the length and at the height of the steps, and an approximately straight transverse member rigidly secured to the downwardly curved portions of the longitudinal frame members, said transverse member projecting outwardly from opposite sides of the two longitudinal frame members and forming a support for the steps.

2. The construction and arrangement of motor car frame and chassis comprising two longitudinal frame members curved downwardly between the axles, foot plates or steps at opposite sides of said frame members, a pair of mud guards at one end of the frame, an approximately straight transverse member rigidly secured to said longitudinal frame members and projecting outwardly from each side thereof to form a support for the foot plates or steps, and a transverse member secured to said longitudinal frame members to support the mud guards.

3. The combination in motor vehicles of two longitudinal frame members curved downwardly between the axles and two transverse members secured to the underside of the longitudinal members extending outwardly to form a rigid support for the footplate and the inner ends of the front and rear mudguards, and a similar straight transverse member extending outwardly to form a support for the rear ends of the rear mudguards.

4. The construction and arrangement of motor car frame and chassis comprising two longitudinal frame members curved downwardly between the axles, a pair of mud guards at one end of the frame, and a transverse member secured to said longitudinal frame members and having portions extending outwardly and upwardly from opposite sides of the longitudinal frame members to form supports for the mud guards.

5. The construction and arrangement of motor car frame and chassis comprising two longitudinal frame members curved downwardly between the axles, foot plates or steps at opposite sides of the longitudinal frame members, an approximately straight transverse member rigidly secured to said longitudinal frame members and projecting outwardly from each side thereof to form a support for the foot plates or steps, and a valance having spaced leg portions, said valance being secured to one of the foot plates and one of the longitudinal frame members.

6. The construction and arrangement of motor car frame and chassis comprising two longitudinal frame members curved downwardly between the axles, a foot plate, an approximately straight transverse member rigidly secured to said longitudinal frame members and projecting outwardly from opposite sides thereof to form a support for the foot plates, and a valance of substantially U-shaped construction rigidly connected with the foot plate and one of the longitudinal frame members.

7. The construction and arrangement of motor car frame and chassis comprising two longitudinal frame members curved downwardly between the axles, two approximately straight transverse members rigidly secured to said longitudinal frame members, and a cantaliver spring pivoted intermediate its ends to one of said transverse members, and secured at its forward end to the other of said transverse members.

8. The construction and arrangement of motor car frame and chassis comprising a main frame, a pair of mud guards at one end of the frame, and a transverse member rigidly secured to the frame and provided with portions extending outwardly and upwardly from opposite sides of the main frame to form a support for the mud guards.

9. The construction and arrangement of motor car frame and chassis comprising two longitudinal frame members curved downwardly between the axles, foot plates at opposite sides of the longitudinal frame members, an approximately straight transverse member rigidly secured to said longitudinal frame members and projecting outwardly from opposite sides of the frame members to form a support for the foot plates, and valances at opposite sides of the frame, each valance having spaced leg portions and being connected with one of the foot plates, the vehicle body and one of the longitudinal frame members.

MARCUS CHARLES INMAN HUNTER.